C. H. JOCKMUS.
FORGED BLANK FOR FUSE BODIES.
APPLICATION FILED DEC. 4, 1916.
1,295,512.
Patented Feb. 25, 1919.
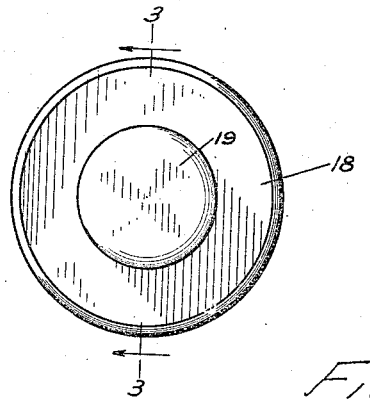
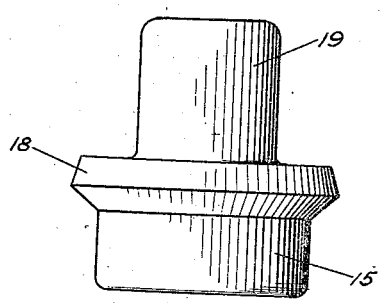
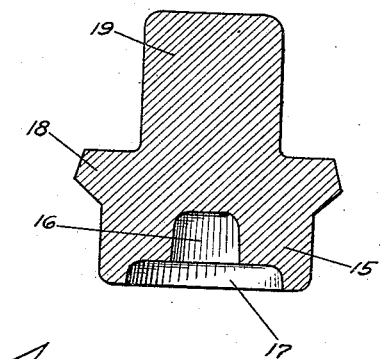
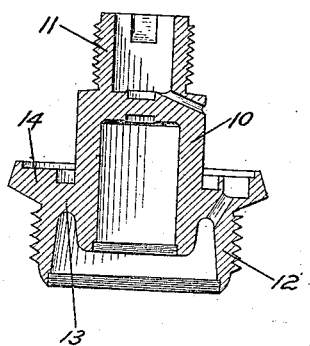
WITNESSES:
INVENTOR
Charles H. Jockmus
BY
Wooster & Bowersock
ATTORNEYS

UNITED STATES PATENT OFFICE.

CHARLES H. JOCKMUS, OF ANSONIA, CONNECTICUT.

FORGED BLANK FOR FUSE-BODIES.

1,295,512.

Specification of Letters Patent. Patented Feb. 25, 1919.

Application filed December 4, 1916. Serial No. 134,865.

*To all whom it may concern:*

Be it known that I, CHARLES H. JOCKMUS, a citizen of the United States, residing at Ansonia, county of New Haven, State of Connecticut, have invented an Improvement in Forged Blanks for Fuse-Bodies, of which the following is a specification.

This invention relates to the manufacture of bodies for time fuses for shells of the type known as the Spanish or Snyder type, and has for its object to produce a novel configuration of blanks for bodies for this type of fuses, which may be forged to approximately the final form, will require a minimum amount of metal, there being no waste other than the metal necessarily removed by the various machining operations, and which permits either end of the blank to be gripped and held firmly by a chuck for machining purposes, thus avoiding loss of time in handling, as either end of the blank may be held by a chuck while the machining operations upon the opposite end are being performed.

With these and other objects in view, I have devised the novel fuse body blank which I will now describe referring to the accompanying drawing forming a part of this specification and using reference characters to indicate the several parts:—

Figure 1 is a plan view of my novel fuse body blank as forged ready for the machining operations;

Fig. 2 an elevation corresponding therewith;

Fig. 3 a central longitudinal section corresponding therewith; and

Fig. 4 is a section of the fuse body after the machining operations have been performed.

It will be noted that the completed body comprises a hollow central hub 10 closed at one end, which I will term for convenience the upper end, a reduced threaded hub 11 extending from the upper end of the central hub, and an enlarged externally threaded hub 12 carried by a web 13, extending from the central hub at a place one-third, more or less, of its height, said hub having at its upper end a flange 14 and relatively fine internal threads being formed at the lower ends of the central hub and the enlarged threaded hub.

It will be noted from Fig. 4 that a number of machining operations are required at each end to transform the forged body into the completed fuse body, during which operations the body must be positioned accurately and held firmly. The difficulty heretofore experienced in holding the body blanks while the machining operations were being performed has been a serious obstacle to the economical manufacture of this class of fuse bodies, as it is of vital importance that the blanks be produced without waste in the forging operation, and that the amount of metal cut away in the machining operations be reduced to the minimum. After many experiments I have succeeded in developing a forged body blank for the Spanish or Snyder type of fuses having concentric base recesses forged therein and having the central hub, hub 12 and the flange, forged to substantially their final form, only sufficient surplus metal being used to provide for perfect machining in the most economical manner, either end of the blank being adapted to be gripped by a chuck and held firmly while the machining operations are being performed on the other end.

My novel body blank as formed, comprises a hub 15, having in its lower end concentric recesses 16 and 17, at its upper end a flange 18, and above the flange a hub 19 of sufficient diameter to provide for finishing the central hub of the completed fuse body and of sufficient length to form the reduced threaded hub 11 as well as the central hub. So far as the present invention is concerned, it is immaterial which end of the blank is finished first. A convenient way of finishing the blank is to first, place lower hub 15 of the blank in a chuck and finish the upper end, and then to place the central hub in a chuck and grip it below reduced threaded hub 11 and then perform the several operations of finishing the lower end of the blank to correspond with Fig. 4.

Having thus described my invention, I claim:—

1. A blank for a fuse body of the Spanish or Snyder type, forged with a hub at its lower end having concentric recesses and at its upper end a flange, and above the flange a hub of sufficient diameter to provide for finishing the central hub of the completed fuse body and of sufficient length to form a reduced threaded hub, as well as the central hub.

2. A blank for a fuse body of the Spanish or Snyder type, forged with a hub at one end having concentric recesses and a flange, and contiguous to the flange a hub of less diameter than the first mentioned hub and adapted to form the central hub and the reduced threaded hub of the completed fuse body, either end of the blank being adapted to be gripped by a chuck and held firmly while the other end is being machined.

In testimony whereof I affix my signature.

CHARLES H. JOCKMUS.

Witness:
LORETTA McCRINDLE.

Copies of this patent may be obtained for five cents each, by addressing the "Commissioner of Patents, Washington, D. C."